United States Patent [19]

Frost et al.

[11] Patent Number: 5,021,204
[45] Date of Patent: Jun. 4, 1991

[54] METHOD FOR SELECTIVELY CHARGING HONEYCOMB STRUCTURES

[75] Inventors: Rodney I. Frost; Robert J. Paisley, both of Corning, N.Y.

[73] Assignee: Corning Incorporated, Corning, N.Y.

[21] Appl. No.: 283,733

[22] Filed: Jul. 15, 1981

[51] Int. Cl.$^5$ ............................................. C04B 37/00
[52] U.S. Cl. ........................................ 264/60; 156/89; 264/251; 264/264; 264/267
[58] Field of Search ................ 264/60, 264, 267, 251; 156/89

[56] References Cited

U.S. PATENT DOCUMENTS

| | | | |
|---|---|---|---|
| 3,680,207 | 8/1972 | Belmonte | 264/264 |
| 3,926,702 | 12/1975 | Oki et al. | 264/60 |
| 4,041,591 | 8/1977 | Noll et al. | 428/117 |
| 4,041,592 | 8/1977 | Kelm | 428/117 |
| 4,200,604 | 4/1980 | Dziedzic | 264/60 |
| 4,276,071 | 6/1981 | Outland | 428/116 |
| 4,283,210 | 8/1981 | Mochida | 264/60 |
| 4,293,357 | 10/1981 | Higuchi et al. | 264/63 |
| 4,304,585 | 12/1981 | Oda | 264/60 |

Primary Examiner—James Derrington
Attorney, Agent, or Firm—Richard N. Wardell

[57] ABSTRACT

A mask apparatus for charging flowable materials into selected cells of a honeycomb structure comprising a solid body having a number of openings extending therethrough which are spaced to coincide with the open ends of the selected cells exposed at the structure's end face, after the mask is positioned across the end face, the flowable material is charged through its openings. In one embodiment, a rigid plate having a number of bores therethrough is provided for charging a plastically formable plugging material into a honeycomb structure in the fabrication of solid particulate filter bodies and other selectively manifolded structures. In a preferred embodiment, a thin transparent polyester film is attached to an open surface of a honeycomb structure and openings melted therethrough. In a second preferred embodiment, a monolithic mask is formed from a flexible elastic polymer and, in addition to openings, has flexible protrusions which assist in aligning the mask on the structure and temporarily plug the cells into which they are inserted preventing them from being inadvertently charged.

24 Claims, 6 Drawing Sheets

METHOD FOR SELECTIVELY CHARGING HONEYCOMB STRUCTURES

BACKGROUND OF THE INVENTION

This invention relates to charging flowable materials into selected cells of a honeycomb structure and, more particularly, to a method and apparatus for use in selectively sealing cells of a honeycomb structure for the fabrication of filter bodies and other selectively sealed honeycomb structures.

Honeycomb structures having transverse cross-sectional cellular densities ranging from one-tenth to one hundred or more cells per square centimeter, especially when formed from ceramic materials, have several uses, including solid particulate filter bodies and stationary heat exchangers, which require selected cells of the structure to closed by manifolding (i.e. plugging), sealing or other means at one or both of their ends.

It is well known that a solid particulate filter body may be fabricated utilizing a honeycomb structure formed by a matrix of intersecting, thin, porous walls which extend across and between two of its opposing end faces and form a large number of adjoining hollow passages or cells which also extend between and are open at the end faces of the structure. To form a filter, one end of each of the cells is closed, a first subset of cells being closed at one end face and the remaining cells being closed at the remaining opposing end face of the structure. Either of the end faces may be used as the inlet face of the resulting filter. The contaminated fluid is brought under pressure to the inlet face and enters the body via those cells which have an open end at the inlet face. Because these cells are closed at the outlet end face of the body, the contaminated fluid is forced through the thin, porous walls into adjoining cells which are sealed at the inlet face and open at the outlet face of the filter body. The solid particulate contaminant in the fluid which is too large to pass through the porous openings in the walls is left behind and a cleansed fluid exits the filter body through the outlet cells for use.

Rodney Frost and Irwin Lachman describe in a copending application, Ser. No. 165,646, filed July 3, 1980, now abandoned, a most efficient solid particulate filter body formed from a honeycomb structure in which the cells are provided in transverse, cross-sectional densities between approximately one and one hundred cells per square centimeter with transverse, cross-sectional geometries having no internal angles less than thirty degrees, such as squares, rectangles, equilateral and certain other triangles, circles, elipses, etc. The cells are also arranged in mutually parallel rows and/or columns. Alternate cells at one end face are closed in a checkered or checkerboard pattern and the remaining alternate cells are closed at the remaining end face of the structure in a reversed pattern. Thus formed, either end face of the filter body may be used as its inlet or outlet face and each inlet cell (open at inlet face and closed at outlet face) shares common thin porous walls with only adjoining outlet cells, (open at outlet face and closed at inlet face) and vice versa. Other cellular cross-sectional geometries and other patterns of sealed cells may be employed to fabricate effective, although perhaps less efficient filter bodies than those of Frost and Lachman.

For the mass production of such filters, it is highly desirable to be able to seal selected cell ends as rapidly and as inexpensively as possible. Frost and Lachman in the previously referred to application Ser. No. 165,646 describe fabricating filter bodies by manifolding the end of each cell individually with a hand-held, single nozzle, air actuated sealing gun. The manifolding of individual cells by this process is long and tedious and is not suited for the commercial production of such filters and other honeycomb structures which may have thousands of cells to be selectively closed. Frost and Lachman also postulate the use of an array of sealant nozzles so that the sealing mixture may be simultaneously injected into a plurality or all of the alternate cells at each end face of the honeycomb structure. However, a working model of this device is not known to exist for plugging honeycomb structures having these higher cell densities.

In a related area, Noll, et al in U.S. Pat. No. 4,410,591, describe alternate methods of fabricating a multiple flow path body such as a stationary heat exchanger. A honeycomb structure is provided having its cells arranged in columns across its open end faces, an open end face of a honeycomb structure is dipped into a flowable resist material and the resist material removed from selected columns by cutting it away together with the common walls of the adjoining cells in the selected column or, alternatively, the walls between the adjoining cells of the selected columns are cut away at the open end face of the structure before dipping the end face into the flowable resist material and the resist material is blown from the selected columns using compressed air directed down the selected columns where the adjoining cell walls had been removed. The end face was thereafter dipped into a slurry of cement to form a sealed channel across each of the selected columns. The remaining flowable resist material was subsequently removed by heating. As the cross-sectional density of cells in the honeycomb structure is increased, for example to improve the efficiency of a filter body, the tolerances needed for the removal of adjoining cell walls required by the Noll, et al method tighten. The problem is particularly heightened when the manifolded body is fabricated from extruded ceramic or ceramic based honeycomb structures as the present state of the ceramic extrusion art cannot provide perfectly parallel rows and/or columns of cells. Also, the Noll, et al method requires the partial destruction of adjoining cell walls and is entirely unsuited for the fabrication of filter bodies where the cells are sealed in a checkered or other possible alternating cell patterns at the end faces.

SUMMARY OF THE INVENTION

It is an object of the invention to provide an approach for the mass plugging of selected cells of a honeycomb structure which is of particular use in the mass production of solid particulate filter bodies as previously described but may be used to charge virtually any flowable material (i.e. fluid or plastically formable material) into selected cells of such a structure.

It is an object of the invention to provide an improved method and apparatus for bulk charging flowable materials into selected cells of a honeycomb structure.

It is another object of the invention to provide an improved method and apparatus for bulk charging flowable materials into selected cells of honeycomb structures which may be adapted to any pattern of selected cells.

It is yet another object of the invention to provide an improved method and apparatus particularly suited for charging a plastically formable material into selected cells of a honeycomb structure.

It is yet another object of the invention to provide an improved method and apparatus for the bulk manifolding of porous honeycomb structures in the fabrication of solid particulate filter bodies.

According to the invention, these and other objects are accomplished by a mask which is applied over an open surface of a honeycomb structure where the open ends of the cells forming the honeycomb are exposed. The mask is provided with a number of openings extending therethrough which are sized and spaced to expose therethrough or coincide with the open ends of only those cells selected to be charged with the flowable material. The flowable material passes from the exposed surface of the mask opposite the structure through the openings into the opposing selected cell ends. The mask is formed from a material impermeable to the material to be charged into the cells and is sufficiently strong to withstand the method of charging selected.

In one embodiment, a ceramic honeycomb filter body is fabricated from a honeycomb structure having a plurality of cells extending therethrough which are arranged in mutually parallel rows and mutually parallel columns at its end faces by providing a rigid plate of metal or other suitable material having bores extending therethrough and positioned across the plate in mutually parallel rows and mutually parallel columns and spaced to coincide with a checkered pattern of alternate cells at the end face. The plate may be fitted to a press which charges a suitable plastically formable plugging material such as a ceramic cement through the bores into an end face of the structure aligned over or downstream of the plate. The process is then repeated with the opposing end face of the structure. Because of the checkered sealing pattern selected and cellular arrangement provided in the honeycomb structure, the same plate may be used. The structure is inverted and its remaining end face positioned against the plate with the bores of the plate aligned opposite the ends of the remaining (as yet unfilled) alternate cells. After filling the alternate cells at the second end face, the structure is fired to sinter the cement to the thin walls at an end of each of the cells. Similar plates may be formed for other cell charging patterns, for other cellular arrangements and for other cellular cross-sectional geometries. Moreover, the embodiment may be used for filling rigid honeycomb structures formed from materials other than ceramics and with flowable materials other than plastically formable cement.

DESCRIPTION OF THE DRAWINGS

The various aspects of the present invention may be more clearly understood with reference to the accompanying figures in which.

DETAILED DESCRIPTION OF THE INVENTION

A detailed description of the invention is hereinafter provided followed by descriptions of three embodiments, each in the context of fabricating solid particulate filter bodies such as those described and claimed by Frost and Lachman in the aforementioned copending application Serial No. 165,646, which is hereby incorporated by reference in its entirety. The second and third are preferred embodiments of the invention for use in the mass production of honeycomb filter bodies.

According to the invention, a flowable material may be charged into selected cells of a honeycomb structure by covering an open surface of the structure where the open ends of the cells are exposed with a mask formed from a solid, either resilient or rigid material having a number of openings extending through it which are located to coincide with the open ends of selected cells. A flowable material may then be passed through the mask openings into the selected cells.

Figure 1:
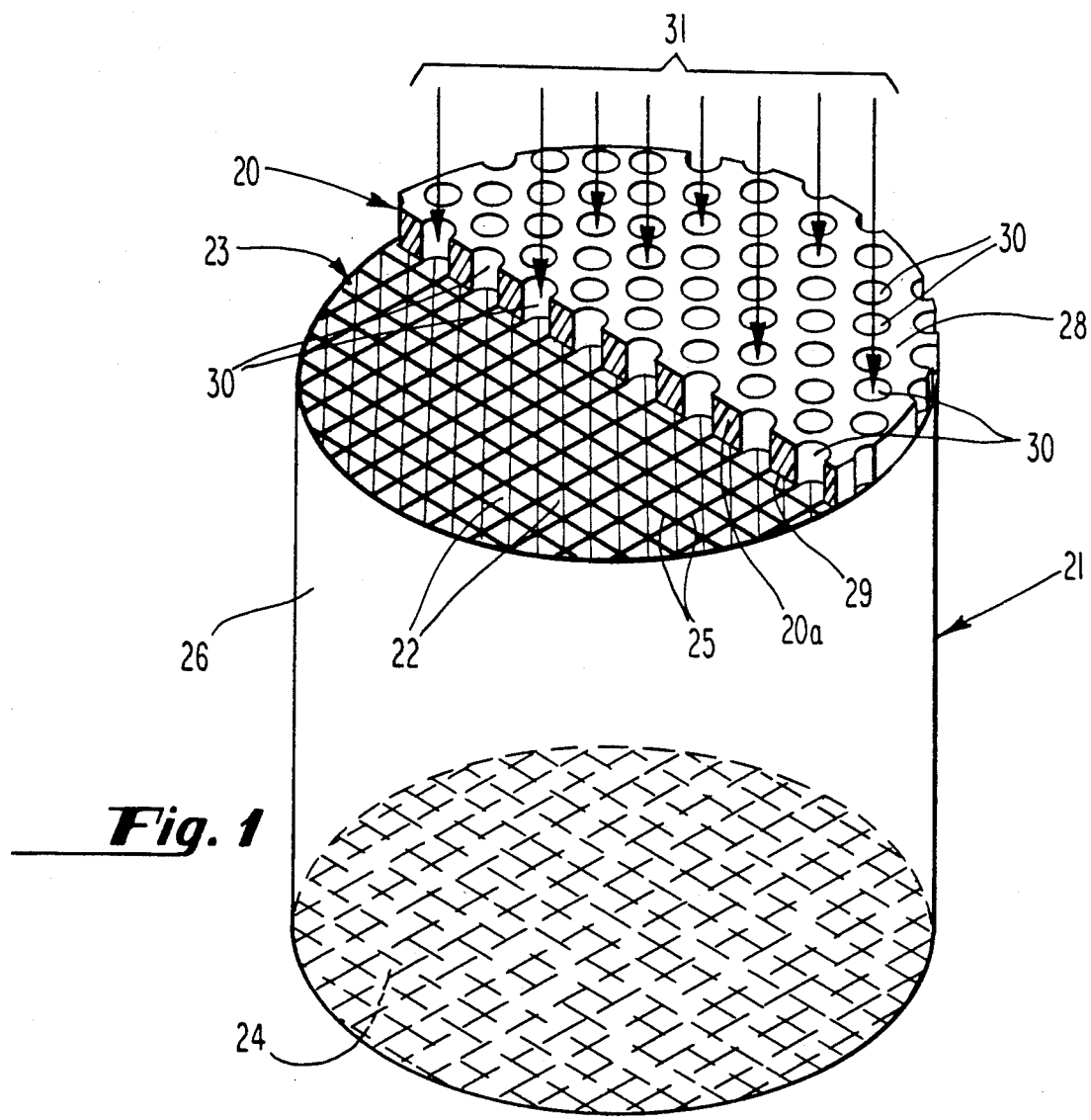
FIG. 1 depicts a partially sectioned exemplary mask of the present invention fitted to a honeycomb structure with which it is used.

FIG. 1 depicts an exemplary mask 20 and an exemplary honeycomb structure 21 with which it is used. The honeycomb structure 21 is provided with a large number of mutually adjacent cells 22 which extend longitudinally and are open at and form a pair of open surfaces at end faces 23 and 24 (hidden) of the structure. The cells 22 are themselves formed by a matrix of thin intersecting walls 25 which also extend across and between the end faces 23 and 24. The structure 21 has also been provided with peripheral side walls 26 surrounding the adjoining cells 22.

The mask 20 depicted has a central body 20a which is formed from a material impermeable to the material to be charged into the honeycomb structure and sufficiently strong to withstand the charging process without being detrimentally deformed. Any number of materials including metal, wood, plastics/ fabrics (treated and untreated), glass, etc. may be used. The body has a pair of opposing outer faces 28 and 29 and a number of openings 30 extending through and between those surfaces. The openings are positioned in the body so as to coincide with the ends of a subset of the cells 22 which are to be charged. The openings 30 are suitably sized to expose the open but not so large a to part all of other cell s expose or any not to be charged. Larger openings can be provided to expose several adjacent cells if desired. When applied to the open end surface of the structure, the mask 20 may require alignment with respect to the structure 21 for the openings 30 and selected cell ends to coincide. The lower or downstream surface 29 of the mask body 20a (as viewed in FIG. 1) is shaped to conform to the end face 23 on which it is positioned so as to minimize the likelihood of crossflow of the filling material into the cells adjoining those to be charged after it has passed through the openings. The manifold body 20a is sufficiently wide to cover at least that portion of the open surface (end face 23) which contains cells which are not to be charged and typically will cover or overlap the entire end face 23 of the structure as depicted in FIG. 1. The mask 20 is held in position against the end face 23 by suitable means, such as an adhering material or a securing device, during the charging process. The flowable filling material is brought against the exposed upper or upstream surface 28 of the mask 20 by any means suitable such as pressure, gravity or a vacuum at the remaining end face 24 and passes through the openings 30 into the proximal open ends of the cells opposite each opening 30 as indicated by the arrows 31.

Figure 2:
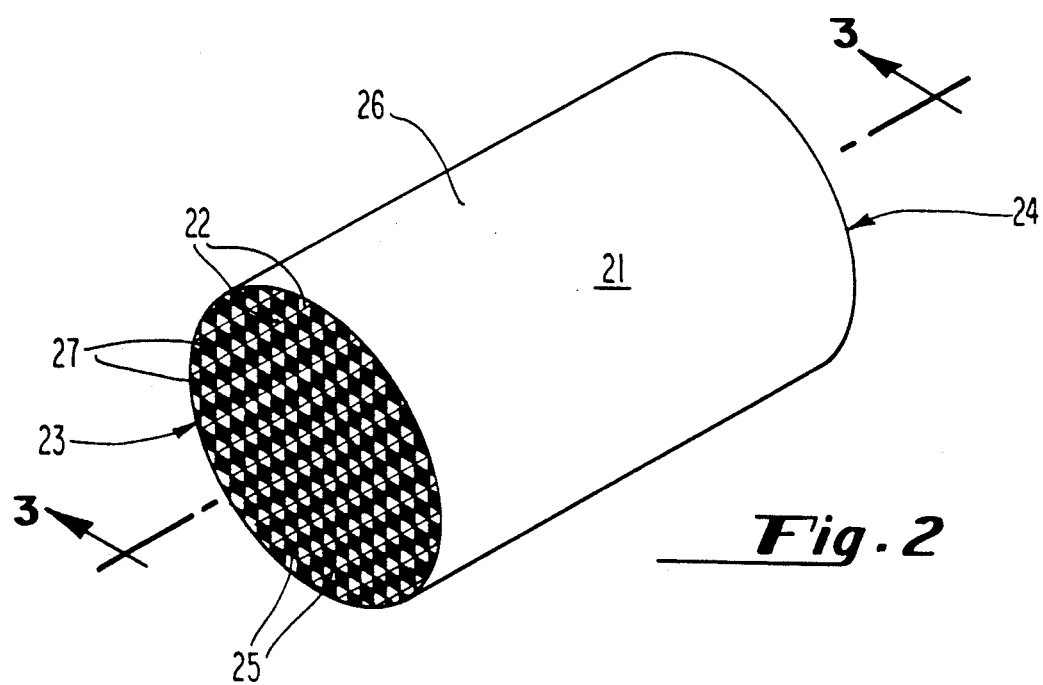
FIG. 2 is a profile view of a solid particulate filter body fabricated using the exemplary mask and honeycomb structure of FIG. 1.
Figure 3:
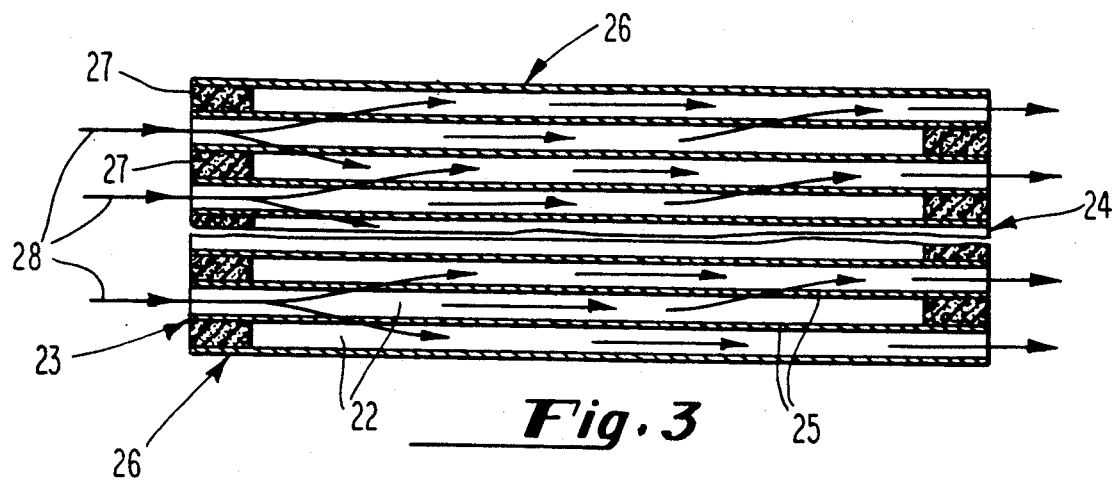
FIG. 3 is a sectioned view of the filter body of FIG. 2 along the lines 3—3.

The invention may be used to fabricate a solid particulate filter body by charging a sealing material into the ends of a first subset of cells at one end face of an appropriate honeycomb structure and into the remaining cells at the remaining end face of the structure. An exemplary solid particulate filter body of the type being referred to is depicted in FIGS. 2 and 3. The filter body is formed from a honeycomb structure 21 as in FIG. 1 having a large number of adjoining cells 22 extending in an essentially mutually parallel fashion through it, the ends of the cells 22 originally being open at and forming a pair of open surfaces at the opposing end faces 23 and 24 of the structure 21. The cells 22 are themselves formed by a matrix of intersecting walls 25 which extend across and between each end face 23 and 24, and which for filter body applications, are continuous, porous and preferably uniformly thin although walls of nonuniform thickness may also be used with less efficiency. A "skin" 26 may be provided around the cells 22 between the end faces 23 and 24 covering the remaining outer surfaces of the structure 21.

Honeycomb structures for solid particulate filter bodies may be formed from a variety of materials including ceramics, glass-ceramics, glasses, metals, cermets, resins or organic polymers, papers or textile fabrics (with or without fillers), etc. and various combinations thereof. Honeycomb structures having the necessary thin, porous, interconnected walls for solid particulate filtering applications are preferably fabricated from plastically formable and sinterable finely divided particles and/or short length fibers of substances that yield a porous sintered material after being fired to effect their sintering, especially metals, ceramics, glass-ceramics, cermets, and other ceramic based mixtures. As desired, any suitable or conventional fugitive or combustible (burnout) additive can be dispersed within the formable and sinterable mixture so as to provide appropriate and adequate open porosity in the sintered material of the walls. Requisite open porosity can be designed into walls by raw material selection as is described in U.S. Pat. 3,950,175. A method of forming such a ceramic honeycomb monolith from an extruded cordierite material which is preferred for moderately high temperature solid particulate filtering applications (less than approximately 1500° C.) is described in the aforementioned Frost and Lachman application Ser. No. 165,646. Several cordierite compositions resulting in varying thin wall porosities are described.

The filter body is formed from the honeycomb structure 21 by closing in some fashion (covering or plugging) the open ends of a first plurality of the cells at one end face and the open ends of the remaining cells at the remaining end face. According to the invention, selected cells are each plugged with a closure means 27, such as a sealant or cement mass, which extends from near the end face 23 or 24 a short distance into the cell 22, and is formed by passing the sealant or cement through the subject mask 20 into the cell ends. After forming, the closure means 27 are cured by any method suitable for the means 27 selected so as to form a seal which will substantially block the flow of the fluid being filtered. It will be appreciated that the closure means 27 may be formed having a porosity equal to or less than that of the thin walls without deleterious effect. The primary flow of the fluid being filtered by the filter body is depicted by lines 28 wiht arrows showing the fluid entering through the open cells (inlet cells) at the end face 23 (inlet face) and, after passing through the thin porous walls into adjoining cells (outlet cells), exiting the filter body through those cells at the end face 24 (outlet face). Again, there may also be some flow through the closure means 27, if they are porous.

The cells 22 of the filter body depicted in FIGS. 2 and 3 have substantially square, transverse cross-sections which are visible at the end faces 23 and 24 and are arranged in substantially mutually parallel rows and substantially mutually parallel columns, as were the cells 22 in FIG. 1. The cells 22 of the filter body in both figures are closed in a desired checkered pattern, the pattern on the end face 24 being the reverse of that seen on the end face 23 of FIG. 2. The reversed sealing patterns can also be seen in the sectioned view of the filter body in FIG. 3. A mask such as that depicted in FIG. 1 may be used to fill such an arrangement of cells in the indicated pattern, the openings 30 being sized and spaced across the mask body 20a in that figure so as to coincide with alternate cells 22 in a checkered pattern across the end face. As was previously mentioned, a filter body may be constructed with other transverse cross-sectional cellular geometries and arrangements of cells at the end faces, and other and sometimes less efficient patterns of sealed cells. Applicant's invention is intended to be used with all patterns and all types of arrangements of selectively closed cells. It will be appreciated that each mask will be specially built to achieve a desired cell charging pattern for a given cell geometry and that several masks having different patterns of openings may be used sequentially with the same structure to charge different materials into different cells.

FIRST EMBODIMENT

Figure 4:
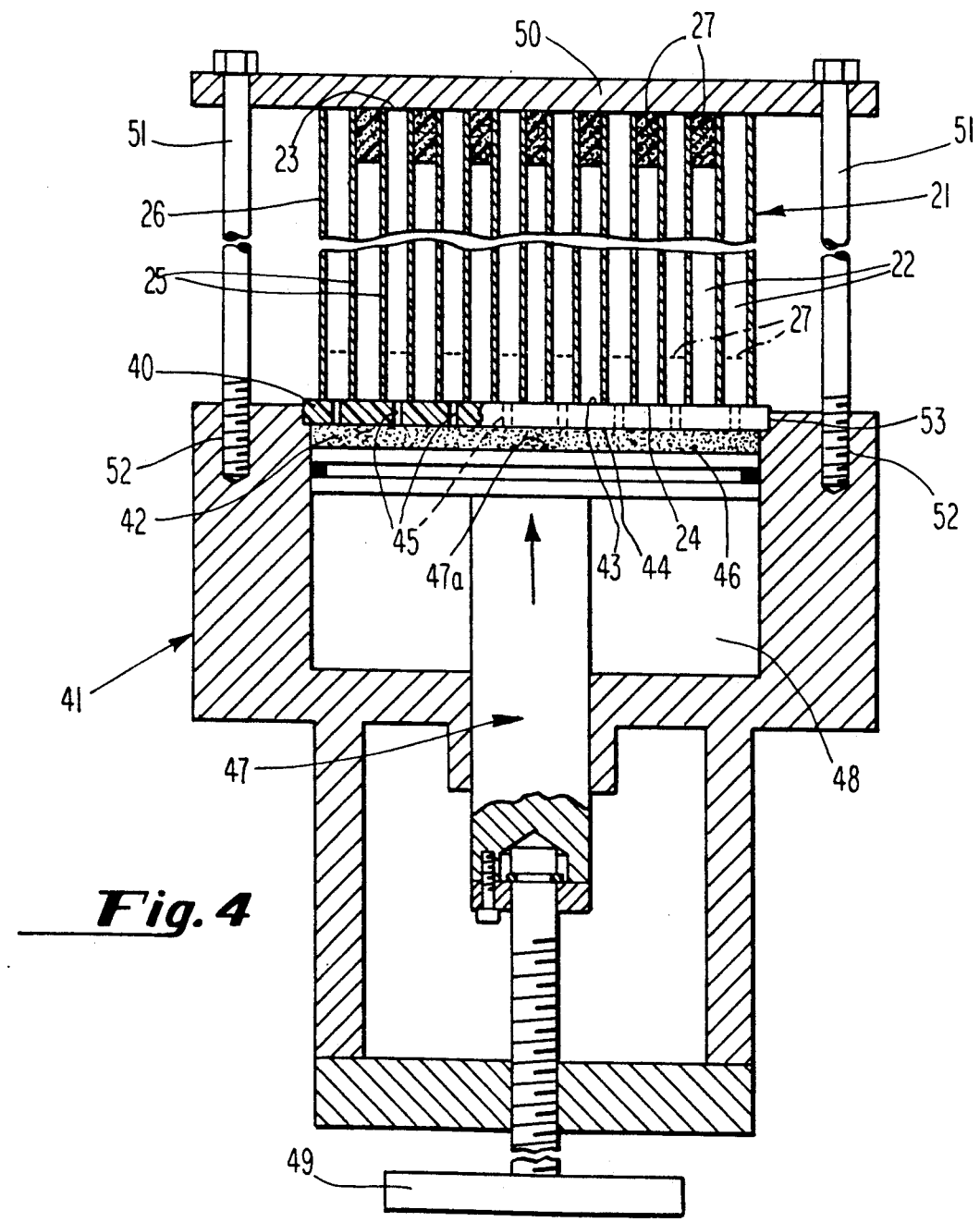
FIG. 4 is a press apparatus for charging a flowable material into a honeycomb structure using one embodiment of the subject mask invention.

A first embodiment mask 40 is depicted in FIG. 4 fitted to a compatibly designed press apparatus 41 for charging a plastically formable cement mixture into the ends of alternate cells of a honeycomb structure 21. The mask 40 and structure 21 are similar in geometry to the mask 20 and structure 21 of FIG. 1. The mask is a rigid plate 40 typically metal having a pair of opposing parallel outer surfaces 43 and 44 and is partially sectioned to reveal several of its bores 45 which extend in a normal direction through and between its surfaces 43 and 44. The structure 21 has also been sectioned to reveal its cells 22 formed by thin porous walls 25 extending across and between end faces 23 and 24. Plugs 27 of a plastically formable cement have already been charged into the alternate cell ends at the end face 23 (top face in FIG. 4) and a cement mass 42 is sitting in a cavity 46 above the head 47a of a piston 47 in the press apparatus 41 about to be charged through the bores 45 in the plate 40 into the ends of the remaining alternate cells at the end face 24. The piston 47 is advanced and retracted in its cylinder 48 by means of a hand operated screw 49 or other suitable means. The structure 21 is held firmly to the upper plate surface 43 during the pressing operations by means of a second plate 50 over its upper end face 23, which itself is held down by appropriate means such as bolts 51 screwed into appropriately threaded bores 52 provided in the press apparatus 41.

The press apparatus 41 is operated in the following manner. The piston 47 is retracted in its cylinder 48 by the screw 49 forming a cavity or chamber 46 above the head 47a of the piston 47. A plastically formable cement is loaded into the cavity 46 from the top of the press apparatus 41. A manganese-magnesium cordierite foam-type cement is described in the aforesaid Frost and Lachman application Ser. No. 165,646, and is suitable for use with any of the cordierite honeycomb structure compositions also described in the same application. If the foam-type cement is used, the honeycomb structure 21 is fired and sintered before being charged in the press 41 and is subsequently refired to foam and sinter the cement in the cells forming durable plugs. Alternatively, it is envisioned that an appropriate material may be charged into a green (dried but not sintered) honeycomb structure and the structure sintered subsequently in a single firing operation. The mask 40 is positioned in a recess 53 formed in the press body upper surface over the cavity 46. The honeycomb structure 21 is placed on the mask 40 and the cells to be filled are aligned with the bores 45 by some suitable means such as by inserting heavy wire or rods down several of those cells and moving the structure 21 across the upper surface 43 of the plate 40 until the wires or rods register with the bores 45. The second plate 50 is then screwed down holding the structure firmly in place and the piston 47 advanced by means of the screw 49 or other suitable means pressing the sealant mass 42 against the lower face 44 of the mask, through the bores 45 and into the open ends of the alternate cells opposite the bores thereby forming closure means 27 (indicated in phantom). After both ends faces 23 and 24 are charged, the structure 21 is fired to sinter the cement, and if appropriate, the structure.

It will be appreciated that the successful employment of this exemplary embodiment to fill both ends of a single structure or to fill several structures sequentially will depend, in part, upon the ability to produce honeycomb structures conforming precisely to a predetermined cellular arrangement. Difficulties may be encountered using the rigid plate mask embodiment 40 heretofor described with the preferred, extruded cordierite honeycomb structures described in the aforesaid Frost and Lachman application Ser. No. 165,646, depending upon the end face areas and cellular densities selected due to distortions sometimes occurring in the cellular arrangements when those structures are produced at higher cell densities in the manner described. Although it is envisioned that the described plate could be employed successfully in fabricating filter bodies from the described cordierite structures being formed with circular end faces about six inches (15 cm) in diameter and square cells at a density of about 50 cells/sq. in. (7.75 cells/sq. cm) it was found in at least one instance that registration between the bores of such a mask and the cells of a comparable structure provided at a density of about 100 cells/sq. in (15.5 cells/sq. cm) could not be obtained across the entire end face. Two preferred embodiments which are hereinafter described, however, are more adaptable to deformations and distortions in such structures and have been successfully employed with these higher cell densities and/or larger honeycomb surface areas.

FIRST PREFERRED EMBODIMENT

Figure 5:
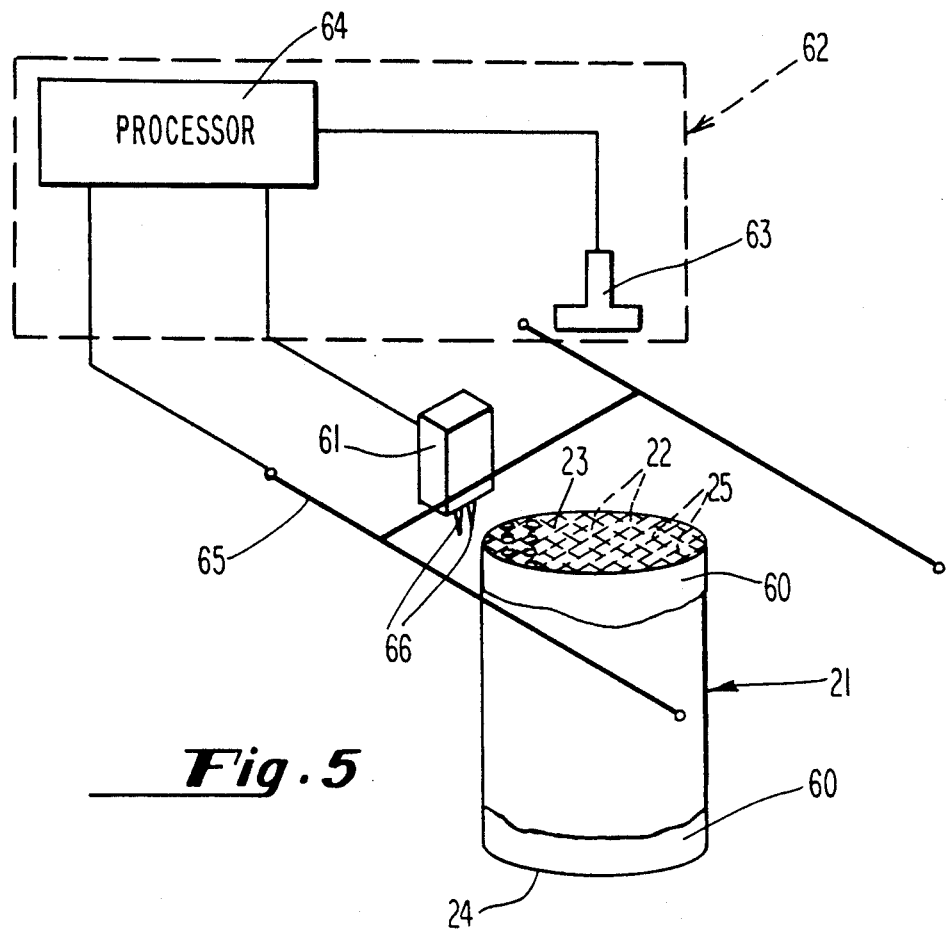
FIG. 5 is a schematic view of a first preferred embodiment of the invention.

A first preferred embodiment of the invention is described and claimed in detail in the copending application Ser. No. 283,732 filed July 15, 1981, by Roy Bonzo, now U.S. Pat. No. 4,557,773 and incorporated by reference herein. In this preferred embodiment of the invention, depicted schematically in FIG. 5, the open end faces 23 and 24 of a honeycomb structure 21, which is provided in the manner previously described, are each covered with a thin transparent film 60, preferably an adhesive backed, pressure-sensitive film formed from a thermoplastic, preferably a polyester. Openings are created through the film 60 opposite selected cells at the end face 23 by means of a high speed tool 61 controlled by an optical image analyzer 62. The optical image analyzer 62 consists of a television camera 63 or other optical device which scans the end face 23 through the transparent film 60 and generates signals indicating the location of the cells 22 and/or thin walls 25 forming the cells beneath the film 60. The signals generated by the camera 63 are carried to a microprocessor 64 which in turn outputs signals to a precision jig 65 which positions the tool 61 to create openings through the film 60 opposite selected cells at the end face 23. In the preferred embodiment, the tool 61 is provided with one or more elements 66 which are heated to melt openings through the preferred polyester film 60. It is further envisioned in this preferred embodiment, that a second set of tool 61, optical image analyzer 62 and jig 65 be provided allowing simultaneous piercing of the films 60 at both end faces of the honeycomb structure 21. In some cases, a suitable film 60 may be mechanically pierced without heat to create the necessary openings therein.

SECOND PREFERRED EMBODIMENT

Figure 6:
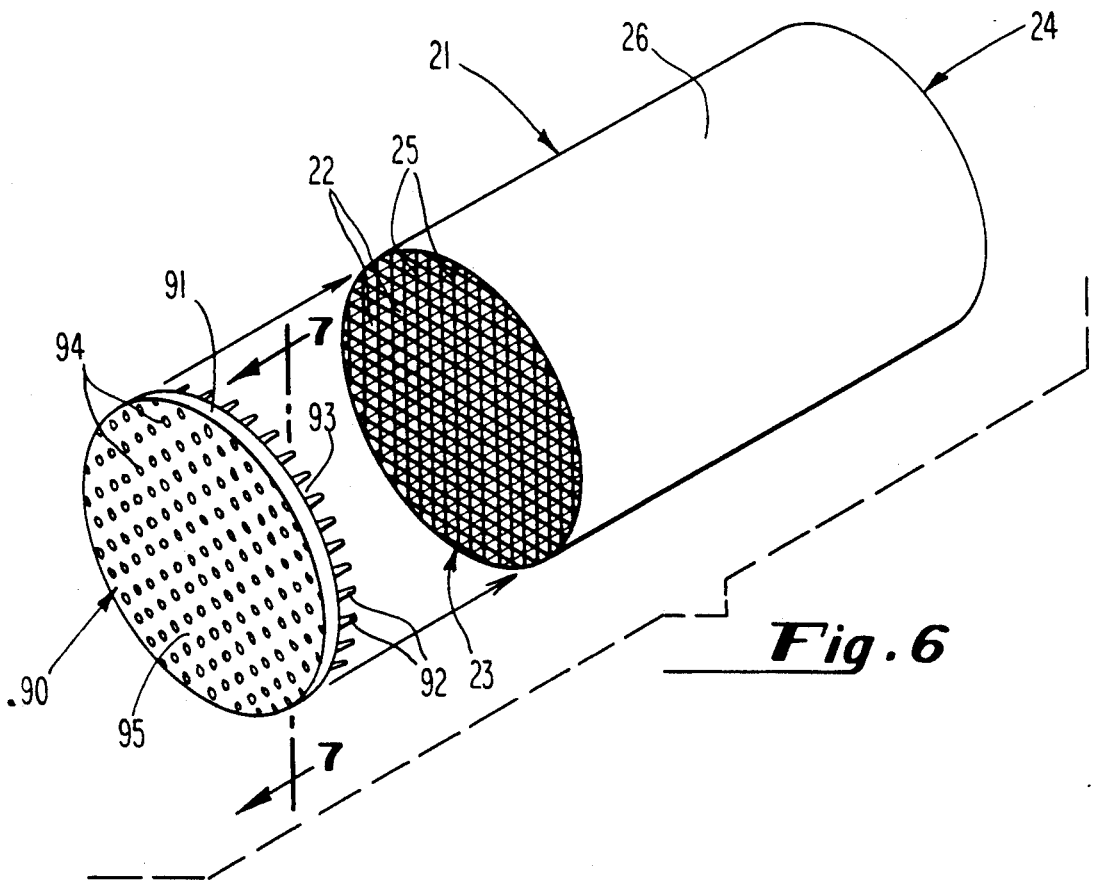
FIG. 6 is a schematic view of a second preferred embodiment of the invention, a flexible mask, and a honeycomb structure with which it is used.
Figure 7:
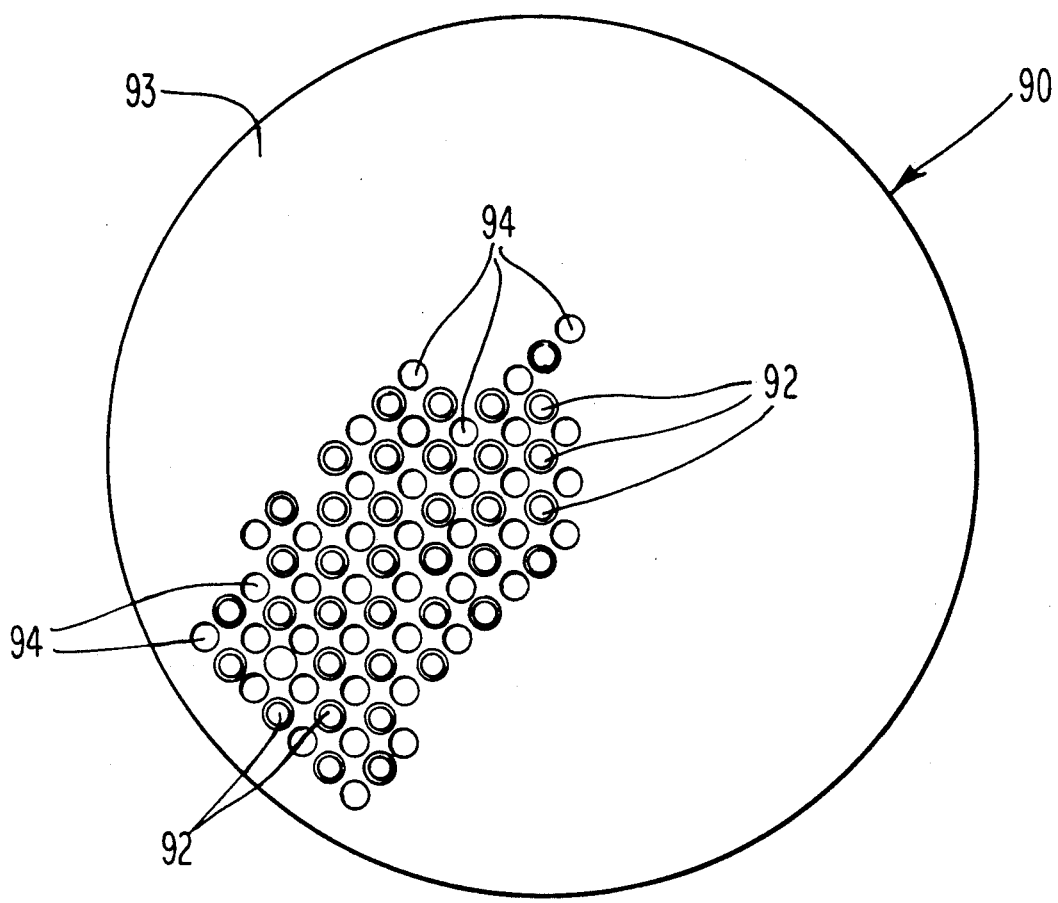
FIG. 7 is a schematic view of the mask of FIG. 6 from one of its outer faces depicting in part the arrangement of alternating protrusions and openings.

A second preferred embodiment of the invention is depicted in FIG. 6 and consists of a flexible mask 90 which can be fitted to either end face 23 or 24 of a honeycomb structure 21. The honeycomb structure 21 is provided in the manner previously described and again has a multiplicity of hollow cells 22 extending between end faces 23 and 24, the cells 22 being formed by a matrix of thin, porous intersecting walls 25 which extend continuously across and between the end faces 23 and 24. The ends of the cells 22 are open at the end faces 23 and 24 revealing their square transverse cross-sectional areas and are arranged in substantially mutually parallel rows and substantially mutually parallel columns, the columns and rows being substantially mutually perpendicular to one another. Again, other cellular transverse cross-sectional geometries and other cellular arrangements may be provided. The mask 90 is the claimed subject of application Ser. No. 283,734, filed July 16, 1981, by M. Montierth, which is now U.S. Pat. No. 4,411,856 and incorporated by reference herein in its entirety. As is revealed in that application, the mask 90 is formed with a central body 91 having a multiplicity of protrusions or "fingers" 92 extending in a substantially normal direction from a substantially planar outer surface 93 of the central body 91. The mask 90 is further provided with a multiplicity of openings 94 extending through the central body 91 between and through the outer surface 93 and an opposing outer surface 95. To plug a subset of alternate cells at the end face 23 in a checkered pattern, the fingers 92 and openings 94 are alternated with each other in the same manner as the two subsets of alternate cells in mutually parallel rows and mutually parallel columns across end face 23. The fingers 92 and openings 94 are alternately arranged across the outer surface 93 of the mask 90, as is illustrated in FIG. 7. The mask 90 with its fingers 92 are preferably formed monolithically from any of several suitable flexible, elastic polymers. As is described in the aforesaid Montierth application Ser. No. 283,734, it is preferred that an elastic mask 90 be formed to be exactly sized to or slightly undersized with respect to the honeycomb structure with which it is used.

Figure 8:
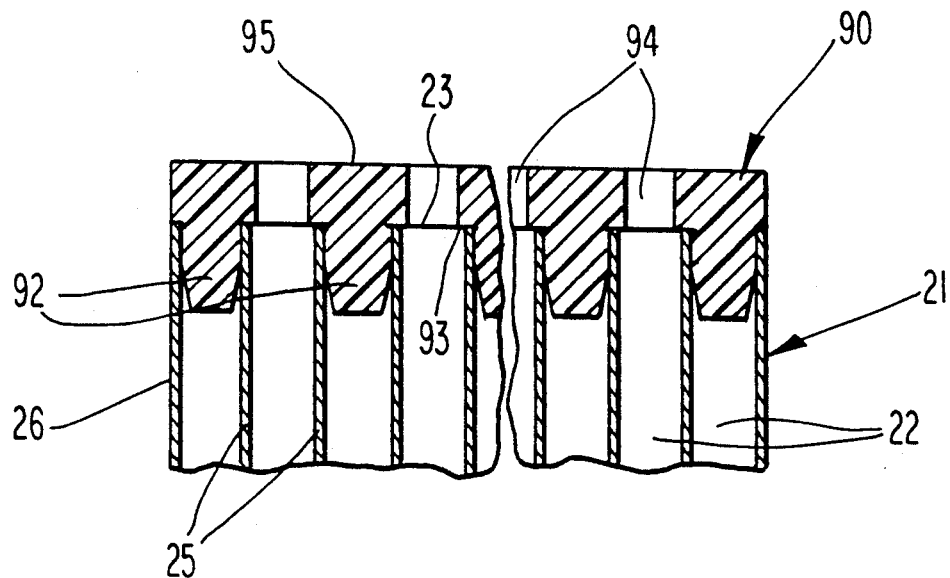
FIG. 8 depicts in an expanded, sectioned view, the joined mask and honeycomb structure of FIG. 6.

The outer face 93 of the mask 90 is fitted to the end face 23 of the honeycomb structure 21, preferably with the assistance of vibrating means such as a vibrating table or the like and centering means such as a corral (neither depicted) as is described and claimed in detail in yet another copending application Ser. No. 283,735, filed July 15, 1981, by Roy Bonzo, now U.S. Pat. No. 4,759,892 and incorporated by reference herein, with each of the fingers 92 filling and preferably sealing the open ends of alternate cells at the end face 23 and each of the openings 94 positioned juxtaposed to the open ends of other remaining alternate subsets of cells at the end face 23 as indicated in FIG. 8.

Figure 9:
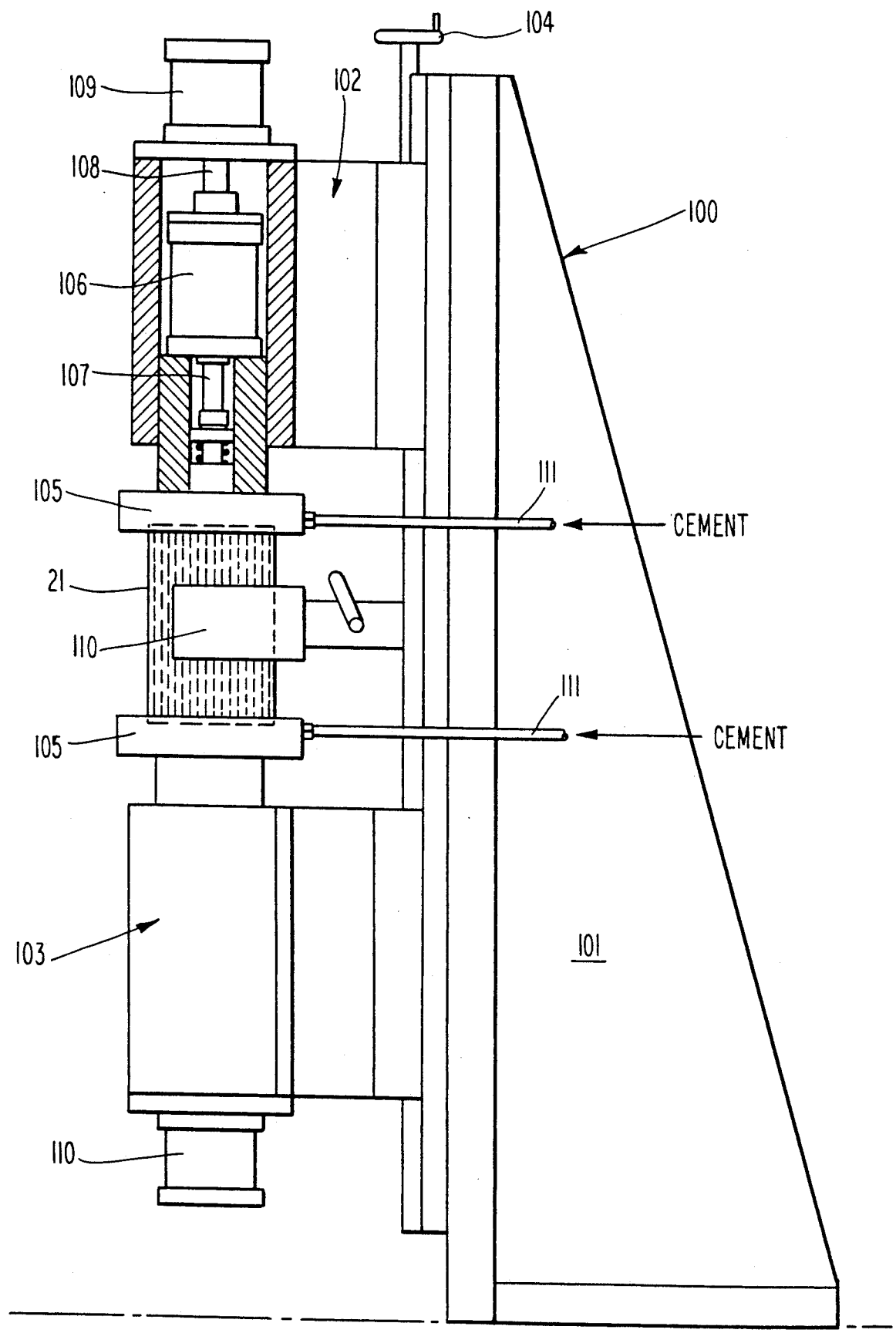
FIG. 9 is a partially sectioned, side schematic view of a preferred double headed press for charging honeycomb structures with plastically formable material.
Figure 10:
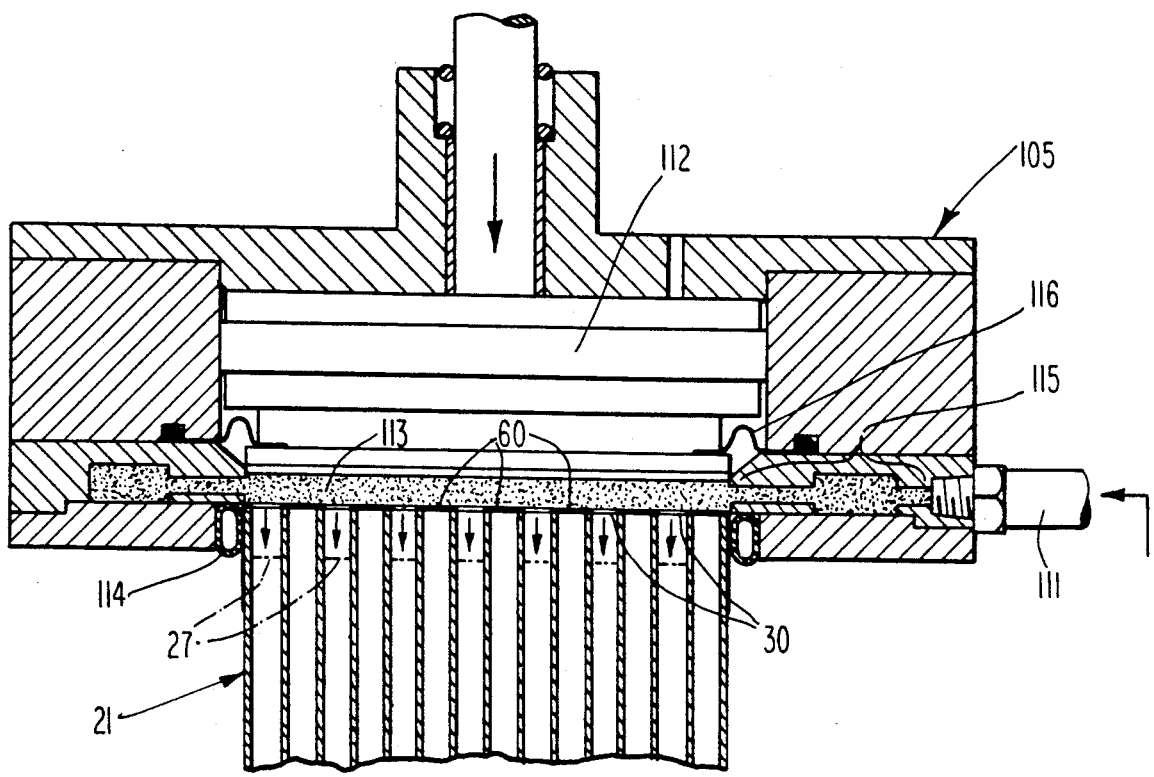
FIG. 10 is a close-up profile and partially sectioned view of a press head of the press apparatus of FIG. 9 being used with a film covered honeycomb structure of the first preferred embodiment.
Figure 11:
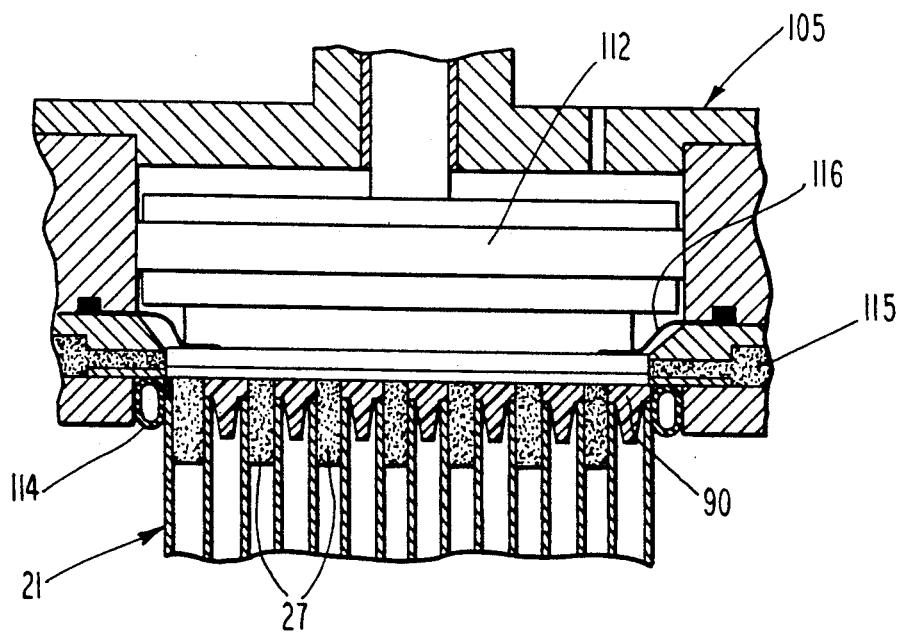
FIG. 11 is a close-up of the press head of FIG. 10 with its piston in the advanced position and depicted with respect to a honeycomb structure fitted with an elastic mask of the second preferred embodiment.

A preferred, double headed press apparatus 100 for charging a plastically formable ceramic cement or comparable material into both end faces of a honeycomb structure is depicted in FIGS. 9, 10 and 11, and described and claimed in the first aforesaid Roy Bonzo application Ser. No. 283,732. The preferred, double headed cement press 100 comprises a frame 101, upper and lower cement heads 102 and 103. The lower cement head 103 is fixed to the frame; the upper head 102 is adjustable in height above the lower cement head 103 by means of a screw 104 turning appropriate mechanical linkages such as a rack and pinion between the frame 101 and head 102 or by other suitable means. The cement heads 102 and 103 are identical in construction and the upper head 102 has been sectioned to reveal its major components. A press head 105, depicted in greater detail in FIGS. 10 and 11, is provided for pressing a plastically formable cement into the honeycomb structure 21. The press head is affixed by suitable means to a first air cylinder 106 having a first plunger 107 which is advanced towards the press head 105 by the operation of the cylinder 106 to advance a piston 112 within the head 105 (see FIGS. 10 and 11) charging the cement into the honeycomb structure 21. A second plunger 108 is connected to the top end of the first air cylinder 106 and is raised and lowered by the operation of a second air cylinder 109 at the top of the cement head 102. The press head 105, plunger 107 and first air cylinder 106 can be lifted by operation of the second air cylinder 109, for insertion of a honeycomb structure 21 into or its removal from the press. A mechanical jaw 110 or similar device may be provided for automatically inserting and removing the honeycomb structure 21 from the press 100. Cement feed tubes 111 are provided to carry cement to the press heads 105 for charging into the structure 21.

It is envisioned that the press 100 may be used with either the perforated film of the first preferred embodiment, as is depicted in FIG. 10, and/or the flexible mask of the second preferred embodiment, as is depicted in FIG. 11. A sectioned press head 105 and partially sectioned honeycomb structure 21 having an end face covered with a preferred thin polyester film 60 is depicted in FIG. 10. Openings 30 have been melted through the film 60 over alternate cell ends in the manner previously described. The end face of the honeycomb structure is held in position across a cavity 113 in the press head by means of a pneumatically inflated collar 114 affixed to the press head which surrounds and frictionally holds the structure 21 by its side walls near the end face. The ceramic cement is carried to the press head 105 through the feed tube 111 and injected into the cavity 113 through a hollow, annular ring 115 formed in the press head 105 and the inner edge of which is open to the chamber 113. After charging the chamber 113 with cement through the ring 115, the piston 112 is advanced by the first air cylinder 106 and first plunger 107 (see FIG. 9) pressing the cement through the openings 30 into the alternate cell ends forming plugs 27 (depicted in phantom). A flexible annular gasket 116 is also affixed to the piston 112 near its head and into the frame of the press head 105 to prevent blowby of the cement into the piston bore.

FIG. 11 depicts the piston 112 in the advanced position and the cement plugs 27 formed in the alternate cells as a result. In this figure, the structure is fitted with a elastic mask 90 previously described.

It is envisioned that the described press will be used with the previously referred to foam-type cordierite and other ceramic cements. In fabricating solid particulate filter bodies it is suggested the press be adjusted to charge at least one-quarter inch (6.4 mm) and preferably one-half inch (12.7 mm) of the foam-type cordierite cement into the cell ends to assure forming a plug which fills the cell end after the sintering operation.

OTHER EMBODIMENTS

While the invention has been described only in terms of an exemplary embodiment and pair of preferred embodiments, several other variations of the mask including the preferred embodiments are possible. For example, the bores of the described plate embodiment may also be fitted with filling tubes to . assist in registration of the mask with the cell ends and to reduce the likelihood of cross-flow of the filling material on the downstream side of the mask into cells not to be filled. Heat shrink film, a film with a thermosetting adhesive backing or other meltable coverings might be used in the first preferred embodiment in lieu of the pressure sensitive adhesive backed film. Also in that embodiment, openings may be formed mechanically rather than by heat.

Other flexible masks may be formed to plug cells which are regularly interspersed among substantially mutually parallel rows and substantially mutually parallel columns of cells at an open surface of a honeycomb structure by applying strips of an adhesive backed flexible webbing impermeable to the sealing material, such as masking tape, over selected rows and columns of cells or, alternatively, by providing a matrix of spaced, overlayed strips of a resilient, impermeable and reusable material such as metal foil which are joined together and fitted, with or without an underlying gasket, over the open surface of the structure with the openings through the matrix and gasket, if provided, positioned opposite the cells to be charged. By providing a honeycomb structure with cells arranged in mutually parallel rows and mutually parallel columns and covering a first set of alternate rows and a first set of alternate columns of cells with strips of a suitable flexible material such as the masking tape or the joined thin metal strips, the open ends of one-half of a subset of cells arranged in a checkered pattern across the end face were exposed. After filling the ends of these cells, the strips were removed and strips applied covering the second set of remaining alternate rows and second set of remaining alternate columns thereby exposing the open ends of the remaining half of the subset of cells of the checkered pattern at the end face for filling. The remaining alternate cells may be exposed for filling at the remaining end face of the structure by covering with the flexible strips in one instance the first set of alternate rows together with the second set of alternate columns and in another instance the second set of alternate rows together with the first set of alternate columns.

Masks may also be formed by attaching to even thinner flexible strips, such as metal wires, rigid plugs such as rivets which are inserted into and cover the open ends of cells not to be manifolded at an end face. The aforesaid desired checkered pattern of plugs can be formed from the aforesaid honeycomb structure having cells arranged in rows and columns by running these thinner strips along and inserting their rigid plugs into a first set of alternate parallel diagonals of cells which are not to be manifolded (see end face 23 of FIG. 2) and manifolded the exposed cells along the remaining parallel diagonals interspersed with the diagonals of cells covered by the rigid plugs. The proper reversed checkered pattern is achieved on the opposing end face by inserting the rivets into the cells of these same remaining parallel diagonals thereby exposing the ends of the cells along the first set of alternate parallel diagonals.

Although the invention has been described in a primary and two preferred embodiments together with suggested modifications and other embodiments, it will be appreciated by one in the art that the aforesaid embodiments were merely illustrative and are not intended to encompass all possible variations of the invention, the scope of which is defined in the appended claims.

What is claimed is:

1. A method of loading a flowable material into a selected plurality of cells of a honeycomb structure having a multiplicity of mutually adjoining cells, including said selected plurality of cells, which are open ended at and extend into the structure from an open surface thereof comprising the steps of:
    covering said open surface with a mask for charging the flowable material into said selected plurality of cells, said mask comprising a body formed of a material impermeable to said flowable material and having a plurality of openings extending therethrough from an outer face thereof to an opposing face thereof positioned juxtaposed said open surface, the openings being sized and positioned across said body to expose therethrough the open ends of said plurality of cells; and
    charging the flowable material from said mask outer face through said openings into the open ends of said plurality of cells.

2. The method of claim 1 wherein said step of covering comprises:
    providing said mask with said openings located opposite the ends of said plurality of cells.

3. The method of claim 2 wherein said step of providing a mask comprises:
    providing said mask in the form of a rigid plate having, as said openings, a plurality of bores extending in a substantially normal direction through and between said outer and opposing faces thereof.

4. The method of claim 1 wherein said flowable material is plastically formable and said step of charging comprises the step of pressing said flowable material against said mask outer surface whereby said material is forced through said openings into the open ends of said plurality of cells.

5. The method of claim 1 wherein each cell of said plurality is adjoined by only cells of the multiplicity which are not members of the plurality.

6. A method of fabricating a solid particulate filter body from a honeycomb structure having a multiplicity of mutually adjoining cells extending therethrough between a pair of opposing end faces thereof, the cells having an open end at each of said end faces and being formed by thin intersecting porous walls extending across and between the end faces, comprising the steps of:
    covering one end face with a mask for charging a plugging material into a first plurality of said cells, said mask comprising a body formed of a material impermeable to said plugging material and having a first plurality of openings extending therethrough from an outer face thereof to an opposing face thereof which is positioned juxtaposed one of said end faces, said first plurality of openings being sized and positioned across said body to expose therethrough the open ends of said first plurality of said cells;
    charging a plugging material from said mask outer face through said first plurality of openings into the open ends of said first plurality of cells;
    covering the remaining end face of said structure with a mask for charging said plugging material into a second plurality of said cells substantially mutually exclusive of said first plurality of cells, said mask comprising a body formed of a material impermeable to said plugging material and having a second plurality of openings extending therethrough from an outer face thereof to an opposing face thereof positioned juxtaposed the remaining one of said end faces, said second plurality of openings being sized and positioned across said body to expose therethrough the open ends of said second plurality of cells; and
    charging said plugging material from said mask outer face through said second plurality of openings into the open ends of said second plurality of cells.

7. The method of claim 6 wherein two steps of covering each comprises:
    providing said mask with said openings; and
    positioning said structure and mask together with said opposing face juxtaposed said end face with said openings opposite said open ends of said plurality of cells.

8. The method of claim 7 wherein said first step of providing said mask comprises providing said mask in the form of a rigid plate having, as said openings, a plurality of bores extending in a substantially normal direction through and between said outer and opposing faces thereof.

9. The method of claim 6 wherein said sealing material is plastically formable and said two steps of charging each comprises the step of pressing said sealing material against said mask outer surface whereby said material is forced through said openings into the open ends of said first and second plurality of cells, respectively.

10. The method of claim 6 wherein each of said first and second plurality of cells adjoins no other cell of its plurality.

11. The method of claim 6 wherein said first and second plurality of cells comprise substantially all of said multiplicity of cells.

12. The method of claim 11 wherein said multiplicity of cells are arranged at said end faces in substantially mutually parallel rows and substantially mutually parallel columns, each row and column being substantially formed by alternating said first and second plurality of cells.

13. The method of claim 7 wherein said mask is reusable and said method further comprises, after each of said charging steps, the step of removing the mask from the end face.

14. The method of claim 13 further comprising, after said first charging step, the step of removing said mask from said one end face and wherein said second covering step comprises positioning said removed mask juxtaposed said remaining end face.

15. The method of claim 7 wherein said honeycomb structure is formed from a ceramic material.

16. The method of claim 15 wherein said plugging material is a ceramic cement and said method further comprises after said second charging step the step of firing said structure whereby said charged ceramic cement is sintered to the walls of the cells.

17. The method of claim 1 wherein said opening face conforms substantially to said open surface and, in said covering step, said opposing face is applied to and against said open surface.

18. The method of claim 6 wherein said opposing face of a mask conforms to said end face with which it is juxtaposed and, in each said charging step, said opposing face is applied to and against said end face with which it is juxtaposed.

19. A method for producing a ceramic honeycomb filter comprises adhering a mask having holes bored at a given portion to an opening end surface of a porous ceramic honeycomb structural body having a large number of channels, charging a sealing material into the channels through the holes in the mask to seal an end portion of the given channels.

20. The method as claimed in claim 19, wherein the sealing material is a batch obtained by mixing ceramic raw material with a binder and a plasticizer.

21. The method as claimed in claim 20, wherein said binder is a cellulose derivative.

22. The method as claimed in claim 19, wherein the sealing material is charged into the channels under pressure.

23. The method as claimed in claim 19, wherein on end surface of a given channel is sealed with a sealing material and then another end surface of the remaining channels is sealed with the sealing material.

24. A method for producing a ceramic honeycomb filter comprises applying a mask having holes bored at a given portion to an opening end surface of a porous ceramic honeycomb structural body having a large number of channels, charging a sealing material into the channels through the holes in the mask to seal an end portion of the given channels.

* * * * *

UNITED STATES PATENT AND TRADEMARK OFFICE
CERTIFICATE OF CORRECTION

PATENT NO. : 5,021,204

DATED : June 4, 1991

INVENTOR(S) : Rodney I. Frost and Robert J. Paisley

It is certified that error appears in the above-identified patent and that said Letters Patent is hereby corrected as shown below:

Column 1, line 18, after "to" should read -- be --.

Column 4, lines 67 and 68 delete -- but not so large a to part all of other cell -- and after "open" should read -- ends of the selected cell or cells sufficiently for charging but not so large as to expose part or all of any other cell --.

Column 5, line 1, delete -- s expose or any --.

Column 6, line 23, -- wiht -- should read -- with --.

Column 14, Claim 17, line 3, -- opening -- should read -- opposing --.

UNITED STATES PATENT AND TRADEMARK OFFICE
CERTIFICATE OF CORRECTION

PATENT NO. : 5,021,204
DATED : June 4, 1991
INVENTOR(S) : Rodney I. Frost, et al It is certified that error appears in the above-identified patent and that said Letters Patent is hereby corrected as shown below:

Column 14, Claim 23, line 28, --on-- should read --one --.

Signed and Sealed this

Nineteenth Day of January, 1993

Attest:

DOUGLAS B. COMER

Attesting Officer

Acting Commissioner of Patents and Trademarks